US011052618B2

(12) United States Patent
Halbritter

(10) Patent No.: US 11,052,618 B2
(45) Date of Patent: Jul. 6, 2021

(54) TAPE LAYUP SYSTEMS AND ASSOCIATED METHODS

(71) Applicant: The Boeing Company, Chicago, IL (US)

(72) Inventor: Allen Halbritter, Charleston, SC (US)

(73) Assignee: The Boeing Company, Chicago, IL (US)

(*) Notice: Subject to any disclaimer, the term of this patent is extended or adjusted under 35 U.S.C. 154(b) by 30 days.

(21) Appl. No.: 16/525,310

(22) Filed: Jul. 29, 2019

(65) Prior Publication Data
US 2021/0031465 A1 Feb. 4, 2021

(51) Int. Cl.
*B29C 70/38* (2006.01)
*B29C 70/54* (2006.01)
*B26D 3/08* (2006.01)
*B26D 1/08* (2006.01)
*B26D 7/26* (2006.01)

(52) U.S. Cl.
CPC .......... *B29C 70/386* (2013.01); *B29C 70/545* (2013.01); *B26D 1/085* (2013.01); *B26D 3/085* (2013.01); *B26D 7/2628* (2013.01)

(58) Field of Classification Search
CPC ..... B29C 70/386; B29C 70/545; B26D 1/085; Y10T 156/1322; Y10T 156/1054; Y10T 156/1361
See application file for complete search history.

(56) References Cited

U.S. PATENT DOCUMENTS 3,027,841 A * 4/1962 Dixson ................ G01C 21/165
244/3.18
3,612,873 A * 10/1971 Alter ........................ G01T 5/10
250/473.1
(Continued)

FOREIGN PATENT DOCUMENTS

CN 101815608 8/2010
ES 2388009 10/2012

OTHER PUBLICATIONS

Machine-generated English abstract for ES 2388009, downloaded from Espacenet.com on Jul. 29, 2019.
(Continued)

*Primary Examiner* — Mark A Osele
*Assistant Examiner* — Christopher C Caillouet
(74) *Attorney, Agent, or Firm* — Dascenzo Gates Intellectual Property Law, P.C.

(57) ABSTRACT

Tape layup systems and associated methods. A tape layup system includes a feed spool and an uptake spool. The feed spool is configured to carry a tape roll of tackifier tape that includes a tackifier material and a backing material, and the uptake spool is configured to carry a backing material roll of the backing material. The tape layup system further includes a torque transmission system configured to convey a torque from the feed spool to the uptake spool. The tape layup system is configured such that conveying a torque from the feed spool to the uptake spool operates to draw the backing material onto the backing material roll. A method of operating a tape layup system includes generating tension in a tackifier tape to rotate a feed spool and consequently rotating an uptake spool to draw a backing material onto a backing material roll.

25 Claims, 6 Drawing Sheets

(56) References Cited

U.S. PATENT DOCUMENTS

| | | | | |
|---|---|---|---|---|
| 3,668,956 | A | * | 6/1972 | Whipple ................ B26D 3/085 |
| | | | | 83/881 |
| 5,110,395 | A | * | 5/1992 | Vaniglia .............. B29C 53/8016 |
| | | | | 156/175 |
| 5,431,749 | A | * | 7/1995 | Messner ............... B29C 70/545 |
| | | | | 156/358 |
| 5,480,508 | A | | 1/1996 | Manabe et al. |
| 5,820,280 | A | * | 10/1998 | Fox ......................... B41J 29/38 |
| | | | | 400/611 |
| 8,048,261 | B2 | | 11/2011 | McCowin |
| 8,272,419 | B2 | | 9/2012 | Hagman et al. |
| 2006/0118244 | A1 | | 6/2006 | Zaballos et al. |
| 2012/0048460 | A1 | * | 3/2012 | Kitada ................. G02F 1/1333 |
| | | | | 156/256 |

OTHER PUBLICATIONS

Machine-generated English abstract for CN 101815608, downloaded from Espacenet.com on Jul. 29, 2019.

* cited by examiner

TAPE LAYUP SYSTEMS AND ASSOCIATED METHODS

FIELD

The present disclosure relates to tape layup systems and associated methods.

BACKGROUND

Composite component manufacturing processes often involve applying a tackifier material to a work surface to hold a composite detail to the work surface, which subsequently may be cured to bond the composite detail to the work surface. Such a tackifier material may be applied in the form of a tackifier solution or in the form of a tackifier tape in which the tackifier material is temporarily bonded to and carried by a backing material. Utilizing a tackifier tape may enable fast and simple application of the tackifier material; however, existing solutions for collecting the backing material that is removed from the tackifier material generally are mechanically complex.

SUMMARY

Tape layup systems and associated methods are disclosed herein. A tape layup system operable to apply a tackifier material to a work surface includes a frame, a feed spool rotatably coupled to the frame and configured to rotate relative to the frame about a feed spool axis, and an uptake spool rotatably coupled to the frame and configured to rotate relative to the frame about an uptake spool axis. The feed spool is configured to carry a tape roll of tackifier tape that includes the tackifier material and a backing material, and the uptake spool is configured to carry a backing material roll of the backing material. The tape layup system further includes a torque transmission system configured to convey a torque from the feed spool to the uptake spool as well as a compaction assembly with a compaction roller configured to press the tackifier material onto the work surface. The tape layup system is configured such that, when the compaction roller is translated along the work surface, the tape layup system operates to generate a tension in the tackifier tape between the compaction roller and the feed spool to pull the tackifier tape from the tape roll and to rotate the feed spool relative to the frame, thereby conveying a torque from the feed spool to the uptake spool via the torque transmission system and rotating the uptake spool relative to the frame to separate the backing material from the tackifier material at the compaction roller and to draw the backing material onto the backing material roll.

Methods are disclosed for operating a tape layup system that includes a tape roll of a tackifier tape loaded onto a feed spool, wherein the tackifier tape includes a tackifier material and a backing material, wherein the tape layup system additionally includes an uptake spool configured to carry a backing material roll of the backing material, wherein the tackifier tape extends between the feed spool and a first compaction roller of the tape layup system, and wherein the backing material extends between the first compaction roller and the backing material roll. A method of operating the tape layup system includes generating tension in the tackifier tape between the tape roll and the first compaction roller and, responsive to the tension generated in the tackifier tape, pulling the tackifier tape from the tape roll to rotate the feed spool relative to a frame of the tape layup system. The method additionally includes separating the backing material from the tackifier material and, responsive to the rotation of the feed spool, rotating the uptake spool relative to the frame to draw the backing material onto the backing material roll.

DESCRIPTION

Figure 1:
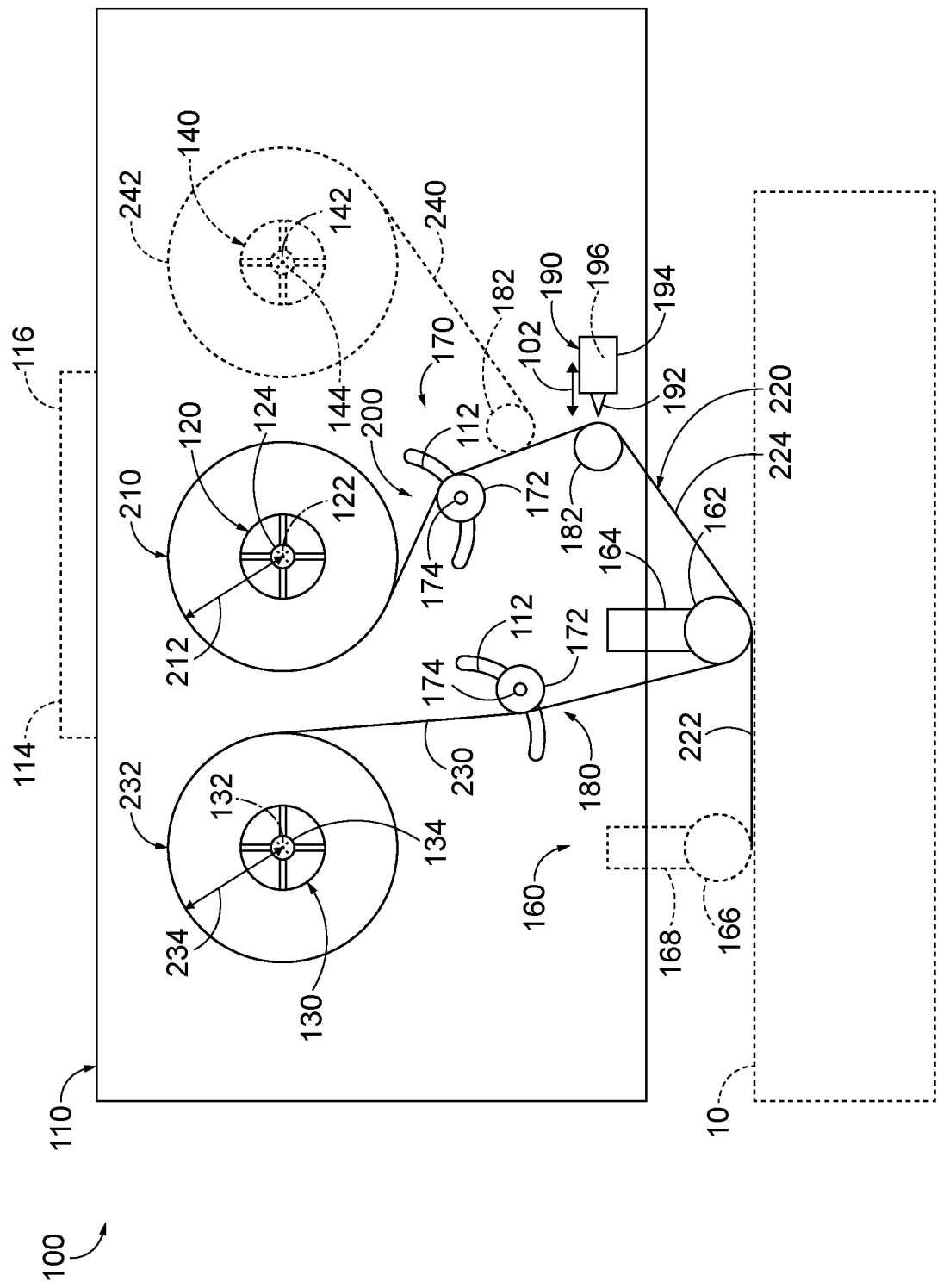
FIG. 1 is a schematic front side elevation view illustrating examples of tape layup systems according to the present disclosure.

FIGS. 1-6 provide illustrative, non-exclusive examples of tape layup systems 100 and/or of methods 300 of operating tape layup systems 100, according to the present disclosure. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

Figure 2:
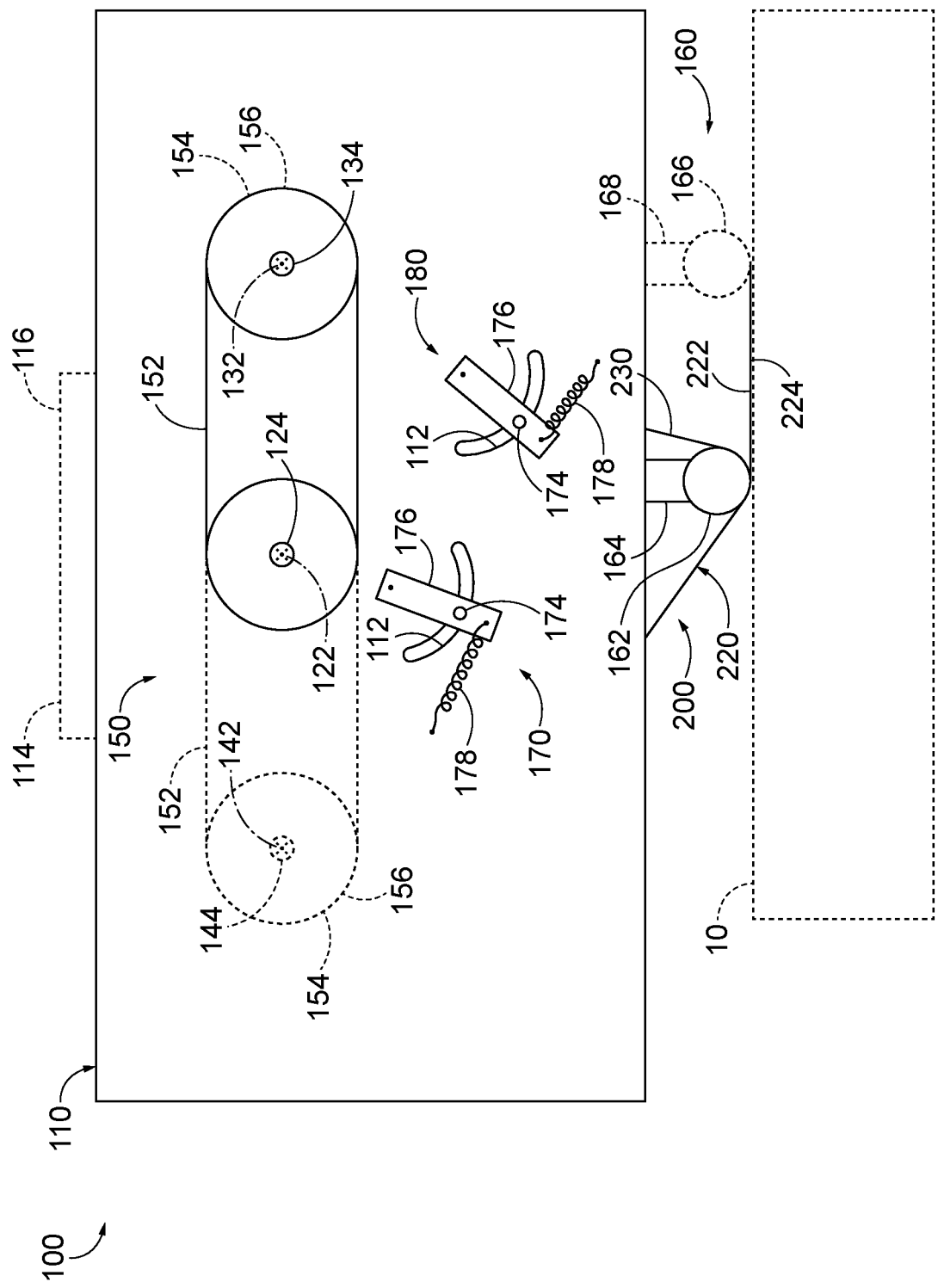
FIG. 2 is a schematic rear side elevation view illustrating examples of tape layup systems according to the present disclosure.

FIGS. 1-2 schematically illustrate examples of tape layup systems 100 according to the present disclosure. As schematically illustrated in FIGS. 1-2, a tape layup system 100 operable to apply a tackifier material 220 to a work surface 10 includes a frame 110, a feed spool 120 rotatably coupled to frame 110 (shown in FIG. 1), and an uptake spool 130 rotatably coupled to frame 110 (shown in FIG. 1). Specifically, feed spool 120 is configured to rotate relative to frame 110 about a feed spool axis 122, and uptake spool 130 is configured to rotate relative to frame 110 about an uptake spool axis 132. Each of feed spool 120 and uptake spool 130 may be operatively coupled to frame 110 in any appropriate manner. As examples, and as schematically illustrated in FIGS. 1-2, feed spool 120 may be operatively coupled to frame 110 via a feed spool shaft 124 that extends at least partially through frame 110. Similarly, uptake spool 130 may be operatively coupled to frame 110 via an uptake spool shaft 134 that extends at least partially through frame 110. In such examples, feed spool shaft 124 may be configured to rotate relative to frame 110 about feed spool axis 122, and/or uptake spool shaft 134 may be configured to rotate relative to frame 110 about uptake spool axis 132. Stated differently, feed spool 120 may be fixedly coupled to feed spool shaft 124, and/or uptake spool 130 may be fixedly coupled to uptake spool shaft 134.

As schematically illustrated in FIG. 1, feed spool 120 is configured to carry a tape roll 210 of a tackifier tape 200. Tackifier tape 200 generally includes tackifier material 220 and a backing material 230 affixed to a first tape side 222 of tackifier material 220. In this manner, tackifier tape 200 may be referred to as a layered tape in which tackifier material 220 and backing material 230 are substantially coextensive. Backing material 230 may have a greater tensile strength relative to tackifier material 220 and/or may be less prone to adhering to components of tape layup system 100 relative to tackifier material 220. In this manner, backing material 230 may be configured to support and/or carry tackifier material 220, such as from tape roll 210 to work surface 10.

Tackifier tape 200 may include and/or be any appropriate adhesive, such as may be utilized in the fabrication of composite components. For example, tackifier tape 200 and/or tackifier material 220 may include and/or be a pre-impregnated ("prepreg") material that includes an adhesive incorporated with a fiber structure, such as a composite fiber structure, a carbon fiber structure, a glass fiber structure, and/or a scrim. In such examples, the adhesive may include and/or be any appropriate material, such as a binder, an epoxy, a resin, and/or a thermoset adhesive.

Tape layup system 100 generally is configured to separate backing material 230 from tackifier material 220 and to collect the separated backing material 230. Specifically, and as schematically illustrated in FIG. 1, uptake spool 130 is configured to carry a backing material roll 232 of backing material 230. More specifically, tape layup system 100 is configured such that, during operative use of tape layup system 100, tackifier tape 200 (i.e., tackifier material 220 in combination with backing material 230) is pulled from tape roll 210 and backing material 230 concurrently is drawn onto backing material roll 232. As schematically illustrated in FIG. 1, and as discussed in more detail herein, tape layup system 100 may include one or more tension rollers 172 and/or one or more guide rollers 182 configured to engage tackifier tape 200 and to at least partially guide tackifier tape 200 from tape roll 210 to work surface 10 and/or to backing material roll 232.

As discussed in more detail herein, tape layup system 100 generally is configured such that pulling tackifier tape 200 from tape roll 210 operates to automatically rotate uptake spool 130 relative to frame 110 to draw backing material 230 onto backing material roll 232. More specifically, and as schematically illustrated in FIG. 2 and described in more detail herein, tape layup system 100 includes a torque transmission system 150 configured to convey a torque from feed spool 120 to uptake spool 130 such that selectively rotating feed spool 120 operates to automatically rotate uptake spool 130. In this manner, tape layup system 100 may be described as being an automatic tape layup system 100 that obviates a need for an independently controlled and/or motorized uptake spool.

As used herein, tape layup system 100 may be described as being "in operative use" and/or as being "operatively utilized" when tape roll 210 of tackifier tape 200 is operatively supported by feed spool 120, when backing material roll 232 is operatively supported by uptake spool 130, and/or when tackifier tape 200, tackifier material 220, and/or backing material 230 operatively extends between two or more components of tape layup system 100, as described herein.

Hence, while the present disclosure generally describes examples in which tape layup system 100 operatively supports tackifier tape 200 (and/or one or more components thereof), such examples are not intended to be limiting, and it is within the scope of the present disclosure that tape layup system 100 is not always utilized in conjunction with tackifier tape 200.

As further schematically illustrated in FIGS. 1-2, tape layup system 100 additionally includes a compaction assembly 160 with a compaction roller 162 that is configured to press tackifier material 220 onto work surface 10. In this manner, translating tape layup system 100 relative to work surface 10 such that compaction roller 162 presses against work surface 10 with tackifier tape 200 positioned therebetween operates to apply tackifier material 220 onto work surface 10. That is, tackifier tape 200 may be configured such that tackifier material 220 adheres to work surface 10, at least upon being pressed onto work surface 10 by compaction roller 162. Thus, during operative use of tape layup system 100, translating tape layup system 100 relative to work surface 10 while compaction roller 162 presses tackifier material 220 onto work surface 10 operates to generate a tension in tackifier tape 200 between compaction roller 162 and feed spool 120. This tension operates to pull tackifier tape 200 from tape roll 210 and thus to rotate feed spool 120 relative to frame 110, thereby conveying a torque from feed spool 120 to uptake spool 130 via torque transmission system 150 to rotate uptake spool 130 relative to frame 110, thus separating backing material 230 from tackifier material 220 at compaction roller 162 and drawing backing material 230 onto backing material roll 232.

Compaction assembly 160 may have any appropriate form and/or structure for pressing tackifier material 220 onto work surface 10. For example, and as schematically illustrated in FIGS. 1-2, compaction assembly 160 additionally may include a roller actuator 164 configured to selectively urge compaction roller 162 toward work surface 10. Roller actuator 164 may include and/or be any appropriate mechanism, such as an electrical and/or pneumatic actuator. Additionally or alternatively, and as schematically illustrated in FIGS. 1-2, compaction roller 162 may be a first compaction roller 162, and compaction assembly 160 additionally may include a second compaction roller 166 configured to further press tackifier material 220 against work surface 10 subsequent to first compaction roller 162 pressing the same portion of tackifier material 220 against work surface 10, such as to ensure that a full width of tackifier material 220 is securely adhered to work surface 10. For example, first compaction roller 162 may be configured to engage backing material 230 to press tackifier material 220 against work surface 10 (e.g., immediately prior to backing material 230 being separated from tackifier material 220), and second compaction roller 166 may be configured to engage tackifier material 220 (e.g., a portion of tackifier material 220 from which backing material 230 has been separated) to further press tackifier material 220 against work surface 10. Stated differently, backing material 230 being separated from tackifier material 220 at first compaction roller 162 and being drawn toward backing material roll 232 may correspond to and/or result in backing material 230 exerting a tension force on tackifier material 220 away from work surface 10, such as due to the adhesive properties of tackifier material 220 upon backing material 230. In this manner, backing material 230 may be described as pulling tackifier material 220 away from work surface 10 subsequent to tackifier material 220 being pressed toward work surface 10 by first compaction roller 162. Thus, in an example of compaction assembly 160 that includes first compaction roller 162 and second compaction roller 166, a given segment of tackifier material 220 may be pressed against work surface 10 first by first compaction roller 162 and subsequently pressed against work surface 10 by second compaction roller 166 to ensure that the given segment of tackifier material 220 is firmly adhered to work surface 10. In such examples, compaction assembly 160 further may include a second roller actuator 168 configured to selectively urge second compaction roller 166 toward work surface 10. Second roller actuator 168 may include and/or be any appropriate mechanism, such as an electrical and/or pneumatic actuator.

As further schematically illustrated in FIGS. 1-2, tape layup system 100 generally is configured such that, during operative use thereof, backing material 230 is separated from tackifier material 220 at compaction roller 162. Stated differently, during operative use of tape layup system 100, backing material 230 may be separated from tackifier material 220 subsequent to, and/or immediately subsequent to, compaction roller 162 pressing tackifier material 220 onto work surface 10. In this manner, during operative use of tape layup system 100, tackifier tape 200 extends between tape roll 210 and compaction roller 162, and backing material 230 extends between compaction roller 162 and backing material roll 232.

As used herein, references to a chronological sequence of events generally are presented from the perspective of a portion (e.g., a given portion) of tackifier tape 200 that is operatively supported by tape layup system 100. Thus, for example, a description of backing material 230 being separated from tackifier material 220 subsequent to compaction roller 162 pressing tackifier material 220 onto work surface 10 is intended to refer to an example in which a given portion of backing material 230 is separated from a corresponding segment of tackifier material 220 subsequent to compaction roller 162 pressing the corresponding segment of tackifier material 220 onto work surface 10. Nonetheless, during operative use of tape layup system 100, compaction roller 162 pressing tackifier material 220 onto work surface 10 and backing material 230 being separated from tackifier material 220 may be described as occurring continuously and concurrently.

As discussed, tape layup system 100 includes torque transmission system 150 for conveying a torque from feed spool 120 to uptake spool 130. In some examples, torque transmission system 150 is configured to automatically rotate uptake spool 130 about uptake spool axis 132 responsive to feed spool 120 rotating about feed spool axis 122. Torque transmission system 150 may have any appropriate form and/or structure for conveying the torque from feed spool 120 to uptake spool 130 during operative use of tape layup system 100. For example, and as schematically illustrated in FIG. 2, torque transmission system 150 may include a drive means 152 that is operatively coupled to each of feed spool 120 and uptake spool 130 to convey the toque from feed spool 120 to uptake spool 130. In this manner, drive means 152 may be described as operatively interconnecting feed spool 120 and uptake spool 130. As a more specific example, and as schematically illustrated in FIG. 2, drive means 152 may be engaged with and/or operatively coupled to one or both of feed spool shaft 124 and uptake spool shaft 134. In such an example, rotating feed spool 120 about feed spool axis 122 may operate to rotate feed spool shaft 124 about feed spool axis 122 such that a torque is transferred from feed spool shaft 124 to uptake spool shaft 134 via drive means 152, thereby rotating uptake spool shaft 134 and uptake spool 130 about uptake spool axis 132. Drive means 152 may include and/or be any appropriate structure and/or mechanism, such as a belt, a chain, and/or a gear.

Drive means 152 may be operatively coupled to one or both of feed spool 120 and uptake spool 130 in such a manner that backing material 230 is drawn onto backing material roll 232 at substantially the same rate as tackifier tape 200 is pulled from tape roll 210. Stated differently, torque transmission system 150 may be configured to convey the torque from feed spool 120 to uptake spool 130 such that pulling tackifier tape 200 from tape roll 210 at a feed rate operates to rotate uptake spool 130 relative to frame 110 such that backing material 230 is added to backing material roll 232 at an uptake rate that is substantially equal to the feed rate. As used herein, the terms "feed rate," "uptake rate," and the like generally refer to linear rates (e.g., linear speeds) at which tackifier tape 200 and/or a component thereof travels relative to frame 110. More specifically, the feed rate may be equal to the product of a tape roll radius 212 of tape roll 210 and a feed spool rotational velocity at which feed spool 120 rotates about feed spool axis 122. As schematically illustrated in FIG. 1, tape roll radius 212 may be measured between feed spool axis 122 and an outer edge of tape roll 210 in a direction perpendicular to feed spool axis 122. Similarly, the uptake rate may be equal to the product of a backing material roll radius 234 of backing material roll 232 and an uptake spool rotational velocity at which uptake spool 130 rotates about uptake spool axis 132. As schematically illustrated in FIG. 1, backing material roll radius 234 may be measured between uptake spool axis 132 and an outer edge of backing material roll 232 in a direction perpendicular to uptake spool axis 132.

In an example in which tape roll radius 212 is substantially equal to backing material roll radius 234, configuring drive means 152 such that the uptake spool rotational velocity is substantially equal to the feed spool rotational velocity generally corresponds to the uptake rate being substantially equal to the feed rate. Accordingly, in such examples, drive means 152 may be operatively coupled to each of feed spool 120 and uptake spool 130 such that feed spool 120 and uptake spool 130 rotate substantially in unison. However, during operative use of tape layup system 100, tape roll radius 212 generally decreases as tackifier material 220 is applied to work surface 10 and backing material roll radius 234 generally increases as backing material 230 is drawn onto backing material roll 232. Accordingly, torque transmission system 150 additionally may be configured such that the feed rate is substantially equal to the uptake rate even when backing material roll radius 234 is larger than tape roll radius 212. Specifically, in such examples, the feed spool rotational velocity must be larger than the uptake spool rotational velocity to ensure that the uptake rate is substantially equal to the feed rate. Thus, and as schematically illustrated in FIG. 2, torque transmission system 150 additionally may include a slip clutch 154 configured to enable uptake spool 130 to rotate such that the uptake spool rotational velocity is smaller than the feed spool rotational velocity. In this manner, slip clutch 154 may operate to limit the extent to which drive means 152 transfers torque from feed spool 120 to uptake spool 130. Slip clutch 154 may include and/or be any appropriate mechanism for limiting an extent to which drive means 152 may transfer torque to uptake spool. For example, slip clutch 154 may be configured to limit the torque that may be transferred from drive means 152 to uptake spool 130 to a predetermined maximum slip torque.

In other examples, tape roll radius 212 may be larger than backing material roll radius 234 during operative use of tape layup system 100. For example, when tackifier tape 200 is loaded onto tape layup system 100 prior to initiating operative use of tape layup system 100 upon work surface 10, backing material roll 232 may be substantially empty and tape roll 210 may be substantially full such that tape roll radius 212 is substantially larger than backing material roll radius 234. Accordingly, torque transmission system 150 additionally may be configured such that the feed rate is substantially equal to the uptake rate even when tape roll radius 212 is larger than backing material roll radius 234. Specifically, in such examples, the uptake spool rotational velocity must be larger than the feed spool rotational velocity to ensure that the uptake rate is substantially equal to the feed rate. Thus, and as schematically illustrated in FIG. 2, torque transmission system 150 additionally may include a tensioner motor 156 configured to supplement the torque provided to uptake spool 130 by drive means 152. For example, when present, tensioner motor 156 may be configured to rotate uptake spool 130 about uptake spool axis 132 to maintain a tension in backing material 230 between compaction assembly 160 and backing material roll 232. In this manner, tensioner motor 156 may be configured to exert a torque on uptake spool 130 such that the uptake spool rotational velocity is greater than the feed spool rotational velocity. Tensioner motor 156 may include and/or be any appropriate mechanism, such as may be configured to exert a torque on uptake spool 130 that is less than a predetermined maximum motor torque. For example, the predetermined maximum motor torque may correspond to a torque that is sufficient to maintain tension in backing material 230 between compaction assembly 160 and backing material roll 232 but that is not sufficient to actively rotate uptake spool 130 to substantially contribute to drawing backing material 230 onto backing material roll 232.

While the examples of tape layup system 100 described herein generally correspond to examples in which torque transmission system 150 includes slip clutch 154 and tensioner motor 156, this is not required, and it is additionally within the scope of the present disclosure that torque transmission system 150 may include and/or be any appropriate alternative and/or additional means for ensuring that the uptake rate is substantially equal to the feed rate. For example, it is within the scope of the present disclosure that torque transmission system 150 may lack slip clutch 154 and/or tensioner motor 156. As more specific examples, torque transmission system 150 may include and/or be a geared transmission system, a variable gear ratio transmission system, a gearbox, an automatic transmission system, a continuously variable transmission (CVT) system, and/or a chain-driven transmission system.

With continued reference to FIG. 1, tape layup system 100 may include a means for selectively partitioning and/or terminating a length of tackifier material 220 that is applied to work surface 10. For example, during operative use of tape layup system 100 and subsequent to applying tackifier material 220 to work surface 10, it may be desirable to cut, score, and/or otherwise break the strip of tackifier material 220 such that a length of tackifier material 220 that was pressed against work surface 10 by compaction assembly 160 remains adhered to work surface 10 when tape layup system 100 and/or a length of tackifier material 220 that extends between tape roll 210 and compaction assembly 160 is removed from work surface 10. Accordingly, and as schematically illustrated in FIG. 1, tape layup system may include a tape separation tool 190 configured to at least partially deform tackifier material 220 such that tackifier material 220 may be severed at compaction roller 162. As used herein, the term "at least partially deform," as used to describe an operation of tape separation tool 190 upon tackifier material 220, may be understood as referring to any appropriate process for preparing tackifier material 220 to be readily severed at compaction roller 162, such as a cutting process, a scoring process, and/or a scribing process. Stated differently, tape separation tool 190 may be configured to score tackifier material 220 and/or to at least partially cut tackifier material 220.

When present, tape separation tool 190 generally is configured to at least partially deform tackifier material 220 such that a portion of tackifier material 220 that is adhered to work surface 10 may be cut, severed, and/or otherwise separated from an adjacent portion of tackifier material 220 that is carried by backing material 230. Accordingly, tape separation tool 190 generally is configured to at least partially deform tackifier material 220 without damaging backing material 230. Stated differently, tape separation tool 190 generally is configured to at least partially deform tackifier material 220 in such a manner that backing material 230 remains intact between tape roll 210 and compaction roller 162 such that backing material 230 may continue to carry tackifier material 220 between tape separation tool 190 and compaction roller 162. As more specific examples, tape separation tool 190 may be configured to at least partially deform tackifier material 220 without scoring backing material 230 and/or without cutting backing material 230.

Tape separation tool 190 may have any appropriate structure and/or functionality for at least partially deforming tackifier material 220. For example, and as schematically illustrated in FIG. 1, tape separation tool 190 may include a blade 192 that is configured to at least partially deform tackifier material 220. In such examples, and as further schematically illustrated in FIG. 1, tape separation tool 190 additionally may include a blade actuator 194 configured to selectively urge blade 192 into contact with tackifier material 220 to at least partially deform tackifier material 220 at a selected location. Blade actuator 194 may include and/or be any appropriate mechanism, such as an electrical and/or pneumatic actuator.

Figure 3:
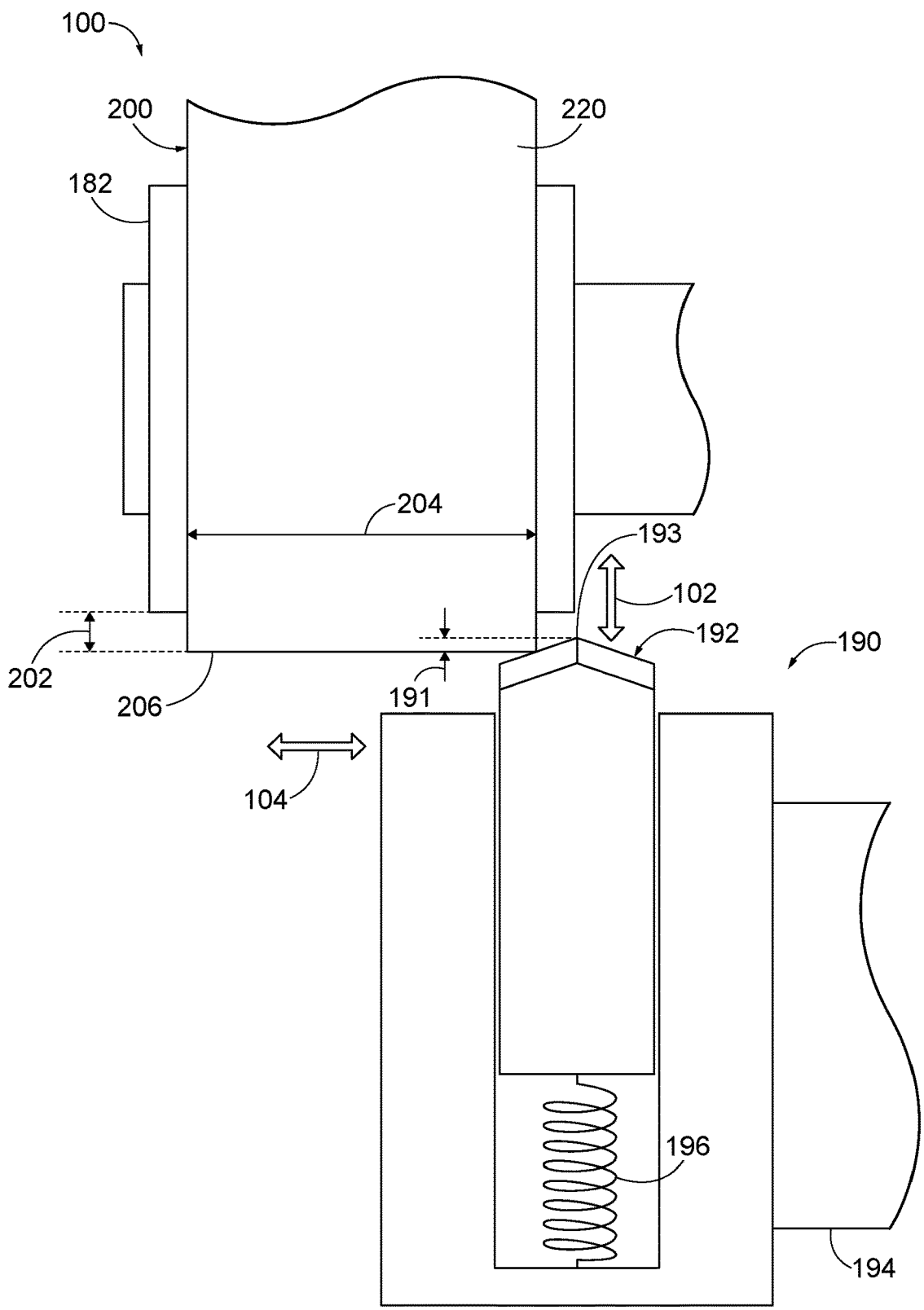
FIG. 3 is a fragmentary top plan view illustrating an example of a tape separation tool of a tape layup system according to the present disclosure.

Blade actuator 194 may be configured to selectively move and/or translate blade 192 in any appropriate manner. As an example, and as schematically illustrated in FIG. 1, blade actuator 194 may be configured to selectively translate blade 192 toward tackifier material 220 along a transverse direction 102 that is at least substantially perpendicular to each of a length of tackifier tape 200 and a width of tackifier tape 200. Additionally or alternatively, blade actuator 194 may be configured to selectively translate blade 192 at least partially across a width of tackifier tape 200. FIG. 3 illustrates an example of tape separation tool 190 that includes blade 192 that is configured to translate across a width of tackifier tape 200 to at least partially deform tackifier material 220. More specifically, and as illustrated in FIG. 3, tackifier tape 200 may be described as having a tape width 204, and blade actuator 194 may be configured to selectively translate blade 192 along a lateral direction 104 that is at least substantially parallel to tape width 204. Blade actuator 194 may be configured to selectively translate blade 192 across a substantial entirety of tape width 204 of tackifier tape 200, such as a distance that is larger than tape width 204.

As shown in FIG. 3, tape separation tool 190 additionally may include a blade spring 196 that biases blade 192 toward tackifier material 220 during operative use of tape layup system 100. In the example of FIG. 3, blade actuator 194 is configured to translate blade 192 across tackifier material 220 in lateral direction 104. As additionally illustrated in FIG. 3, blade 192 may include a blade tip 193, and blade spring 196 may bias blade 192 such that blade tip 193 extends beyond a proximal surface 206 of tackifier material 220 that faces blade 192 by a score depth 191. As illustrated in FIG. 3, score depth 191 may correspond to a distance by which blade tip 193 extends beyond proximal surface 206 along transverse direction 102 when blade tip 193 is spaced apart from tackifier material 220, such as prior to blade actuator 194 translating blade 192 across tackifier material 220 along lateral direction 104. Additionally or alternatively, score depth 191 may correspond to a distance by which blade tip 193 extends beyond proximal surface 206 when blade 192 engages tackifier material 220. As more specific examples, score depth 191 may correspond to an extent to which blade tip 193 penetrates tackifier material 220 and/or an extent to which blade 192 deforms tackifier material 220 relative to a nominal position of proximal surface 206 when blade actuator 194 brings blade 192 into contact with tackifier material 220.

In some examples, tape separation tool 190 and/or blade spring 196 may be configured such that blade actuator 194 translating blade 192 across tackifier material 220 along lateral direction 104 operates to urge blade 192 in a direction opposite the bias of blade spring 196. For example, when tackifier material 220 is a thin and/or brittle material, translating blade 192 across tackifier material 220 with a light pressure may be sufficient to deform tackifier material 220 such that tackifier material 220 is readily severed at compaction roller 162. Thus, in such examples, blade spring 196 may have a spring force that is sufficiently strong to urge blade 192 into contact with tackifier material 220 and that is sufficiently weak that engagement between tackifier material 220 and blade 192 operates to translate blade 192 away from tackifier tape 200 (e.g., away from backing material 230).

FIG. 3 illustrates an example of blade 192 that is configured to translate across the width of tackifier tape 200 to at least partially deform tackifier material 220. In particular, and as discussed, FIG. 3 illustrates an example in which blade actuator 194 translates blade 192 along lateral direction 104 to draw blade 192 across the full width of tackifier material 220. However, this is not required of all examples of tape separation tool 190, and it is additionally within the scope of the present disclosure that blade 192 may be configured to contact a full width of tackifier material 220 even when blade actuator 194 translates blade 192 primarily and/or solely along transverse direction 102. In such examples, and in contrast to the example illustrated in FIG. 3, blade 192 and/or blade tip 193 may have a width that is substantially equal to or greater than tape width 204. Additionally or alternatively, in such examples, blade 192 and/or blade tip 193 may extend at least substantially parallel to a surface of tackifier material 220 that is contacted by blade 192.

Tape separation tool 190, blade 192, and/or blade spring 196 may be configured such that score depth 191 assumes any appropriate value during operative use of tape layup system 100, such as a value that is sufficiently large to cause tackifier material 220 to be severed at compaction roller 162 and/or that is sufficiently small that tape separation tool 190 does not damage backing material 230. As more specific examples, tackifier tape 200 may have tape thickness 202, as measured along a direction that is at least substantially parallel to transverse direction 102, and score depth 191 may be at least 5% of tape thickness 202, at least 10% of tape thickness 202, at least 20% of tape thickness 202, at least 30% of tape thickness 202, at least 50% of tape thickness 202, at least 75% of tape thickness 202, at most 90% of tape thickness 202, at most 80% of tape thickness 202, at most 60% of tape thickness 202, at most 40% of tape thickness 202, at most 25% of tape thickness 202, at most 15% of tape thickness 202, and/or at most 7% of tape thickness 202. Additionally or alternatively, score depth 191 may be at least 0.01 millimeter (mm), at least 0.03 mm, at least 0.05 mm, at least 0.1 mm, at least 0.15 mm, at least 0.3 mm, at least 0.5 mm, at most 1 mm, at most 0.7 mm, at most 0.2 mm, at most 0.17 mm, at most 0.12 mm, at most 0.07 mm, and/or at most 0.02 mm.

In some examples, tape layup system 100 may be configured to be utilized in conjunction with tackifier tape 200 that includes a plurality of distinct backing materials. For example, and as schematically illustrated in FIG. 1, backing material 230 may be a first backing material 230, and tackifier tape 200 additionally may include a second backing material 240 that is affixed to a second tape side 224 of tackifier material 220 that is opposite first tape side 222. In such examples, and as schematically illustrated in FIG. 1, uptake spool 130 may be a first uptake spool 130, and tape layup system 100 additionally may include a second uptake spool 140 configured to carry a second backing material roll 242 of second backing material 240. In such examples, second uptake spool 140 also may be rotatably coupled to frame 110, such as via a second uptake spool shaft 144 that extends at least partially through frame 110, and may be configured to rotate about a second uptake spool axis 142. In such examples, tape layup system 100 may be configured to separate second backing material 240 from tackifier material 220 and to draw second backing material 240 onto second backing material roll 242. More specifically, in such examples, torque transmission system 150 further may be configured such that pulling tackifier tape 200 from tape roll 210 operates to automatically rotate second uptake spool 140 about second uptake spool axis 142 responsive to feed spool 120 rotating about feed spool axis 122 to draw second backing material 240 onto second backing material roll 242. In an example of tape layup system 100 that includes first uptake spool 130 and second uptake spool 140, tape layup system 100 may be configured to separate second backing material 240 from tackifier material 220 at any appropriate location, such as a location between tape roll 210 and tape separation tool 190. In this manner, tackifier material 220 may be exposed to tape separation tool 190 such that second backing material 240 does not interfere with the operation of tape separation tool 190 upon tackifier material 220.

With continued reference to FIGS. 1-2, tape layup system 100 additionally may include one or more components configured to guide tackifier tape 200 between tape roll 210, compaction roller 162, and/or backing material roll 232, and/or to maintain a tension in a portion of tackifier tape 200 and/or of a component thereof. For example, and as schematically illustrated in FIG. 1, tape layup system 100 may include one or more guide rollers 182 rotatably coupled to frame 110 and configured to engage backing material 230 to guide backing material 230 and/or tackifier tape 200 relative to frame 110. Additionally or alternatively, and as schematically illustrated in FIGS. 1-2, tape layup system 100 may include a tackifier tape tensioning assembly 170 configured to apply a tension to tackifier tape 200 between tape roll 210 and compaction assembly 160 and/or a backing material tensioning assembly 180 configured to apply a tension to backing material 230 between compaction assembly 160 and backing material roll 232. In an example of tape layup system 100 that includes first uptake spool 130 and second uptake spool 140, backing material tensioning assembly 180 additionally or alternatively may be configured to apply a tension to second backing material 240 between tape roll 210 and second backing material roll 242.

When present, tackifier tape tensioning assembly 170 and/or backing material tensioning assembly 180 may include any appropriate components for applying a tension to a component of tackifier tape 200. For example, and as schematically illustrated in FIG. 1, tackifier tape tensioning assembly 170 and/or backing material tensioning assembly 180 may include one or more tension rollers 172 configured to engage backing material 230. Each tension roller 172 may be configured to rotate relative to backing material 230 and/or to frame 110 such that backing material 230 moving past tension roller 172 operates to rotate tension roller 172 in such a manner that tension roller 172 rolls against backing material 230 without slipping. In such examples, and as schematically illustrated in FIGS. 1-2, tackifier tape tensioning assembly 170 and/or backing material tensioning assembly 180 may include one or more tension roller shafts 174, each of which may be operatively and rotatably coupled to a respective tension roller 172. In such examples, and as further schematically illustrated in FIG. 2, tackifier tape tensioning assembly 170 and/or backing material tensioning assembly 180 may include one or more tension arms 176, each of which may be coupled to a respective tension roller shaft 174 and pivotally coupled to frame 110. In this manner, each tension roller 172 may be described as being operatively coupled to frame 110 via the respective tension roller shaft 174 and the respective tension arm 176. In such examples, and as further schematically illustrated in FIG. 2, tackifier tape tensioning assembly 170 and/or backing material tensioning assembly 180 additionally may include one or more tension springs 178, each of which may be coupled to a respective tension arm 176 and to frame 110. In this manner, each tension spring 178 may operate to bias tension roller shaft 174 in such a manner that tension roller 172 is biased toward backing material 230 during operative use of tape layup system 100, thereby applying a tension to tackifier tape 200 and/or to backing material 230. As schematically illustrated in FIGS. 1-2, tackifier tape tensioning assembly 170 and/or backing material tensioning assembly 180 may be configured such that at least one tension roller 172 is on an opposite side of frame 110 relative to the respective tension arm 176, such as to prevent tension arm 176 from interfering with tackifier tape 200. In such examples, and as schematically illustrated in FIGS. 1-2, frame 110 may define one or more slots 112 such that each tension roller shaft 174 extends through a respective slot 112.

With continued reference to FIGS. 1-2, tape layup system 100 additionally may include one or more components configured to facilitate supporting and/or moving tape layup system 100 relative to work surface 10. For example, and as schematically illustrated in FIGS. 1-2, tape layup system 100 may include an end effector coupling structure 114 configured to operatively engage an end effector of a robot to enable the robot to carry and/or operate tape layup system 100. Additionally or alternatively, tape layup system 100 may include a handle 116 configured to be gripped by a human user to enable the human user to carry and/or operate tape layup system 100. When present, end effector coupling structure 114 and/or handle 116 may be operatively coupled to frame 110 or may describe corresponding portions and/or components of frame 110. In some examples, end effector coupling structure 114 and handle 116 may be the same structure, and/or may correspond to respective portions of a given structure.

Figure 4:
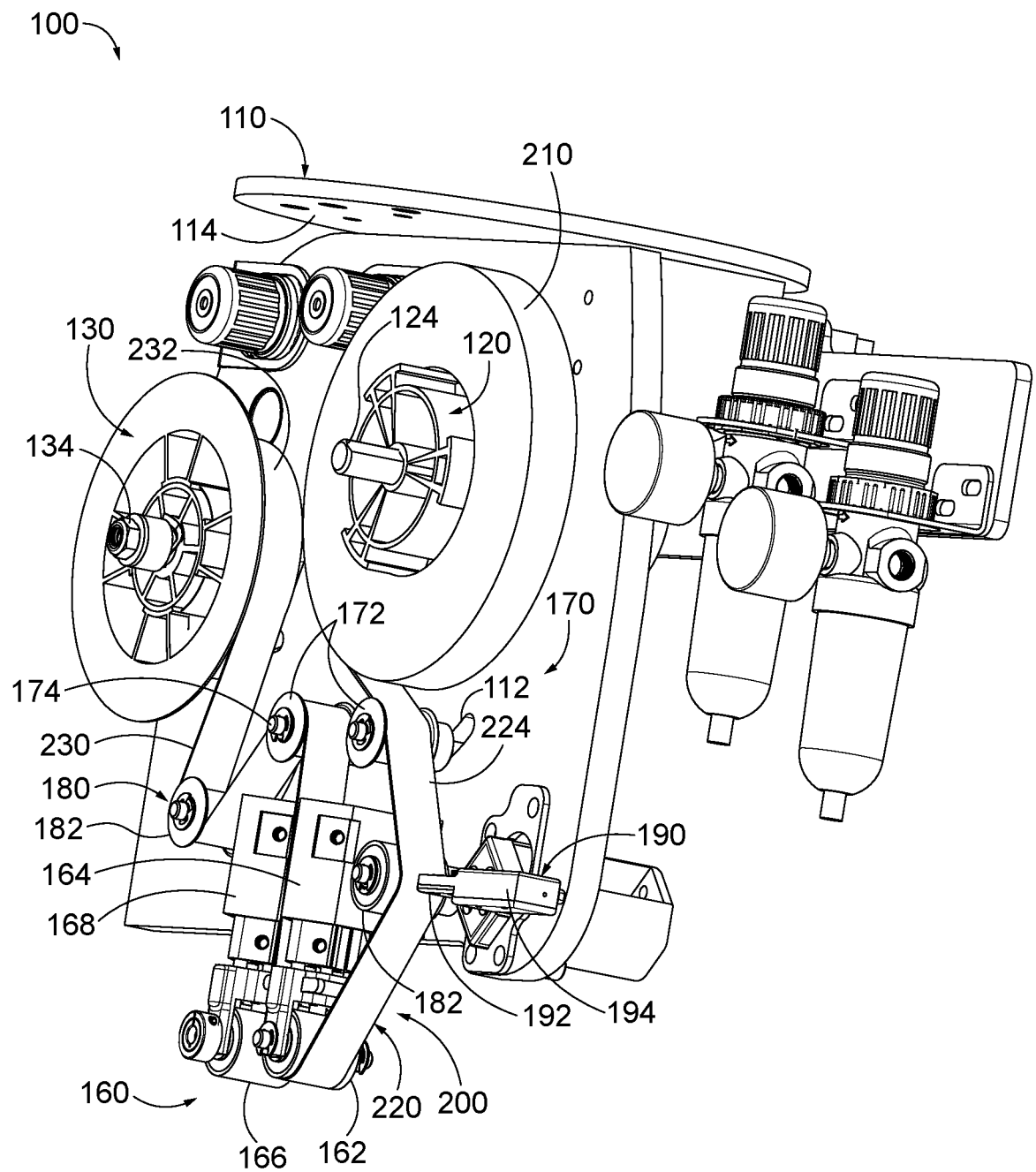
FIG. 4 is a front side isometric view illustrating an example of a tape layup system according to the present disclosure.
Figure 5:
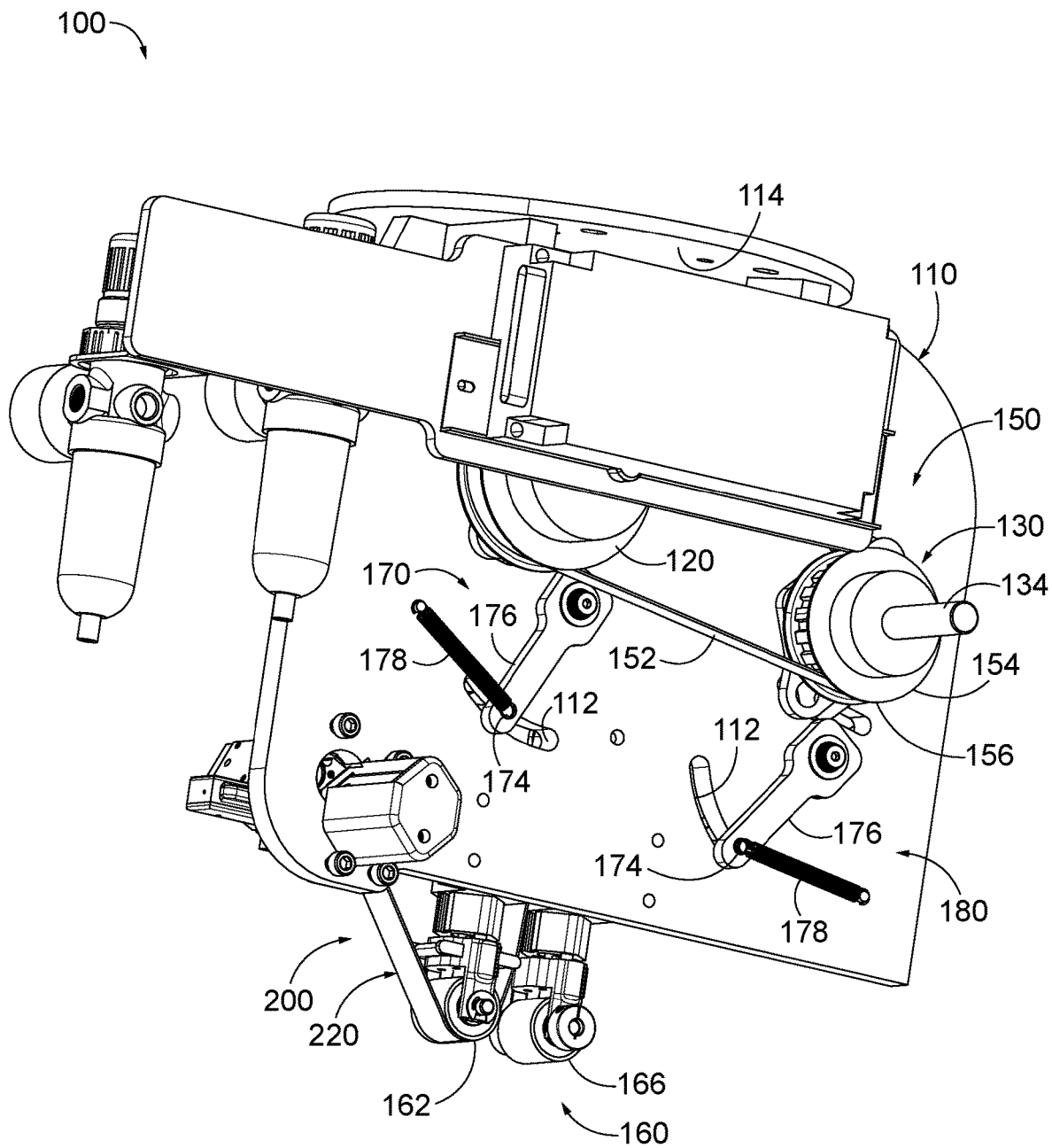
FIG. 5 is a rear side isometric view illustrating the tape layup system of FIG. 4.

FIGS. 4-5 are less schematic illustrations of an example of tape layup system 100. Specifically, FIG. 4 illustrates tape layup system 100 with tape roll 210 of tackifier tape 200 loaded onto feed spool 120 and with backing material 230 being fed to backing material roll 232 that is loaded on uptake spool 130. FIG. 5 illustrates torque transmission system 150 that include drive means 152 in the form of a belt that operatively interconnects feed spool 120 and uptake spool 130. In the example of FIGS. 4-5, compaction assembly 160 includes first compaction roller 162 that is actuated by first roller actuator 164 and second compaction roller 166 that is actuated by second roller actuator 168. FIGS. 4-5 further illustrate an example in which frame 110 includes end effector coupling structure 114 for mounting tape layup system 100 on a robotic arm.

Figure 6:
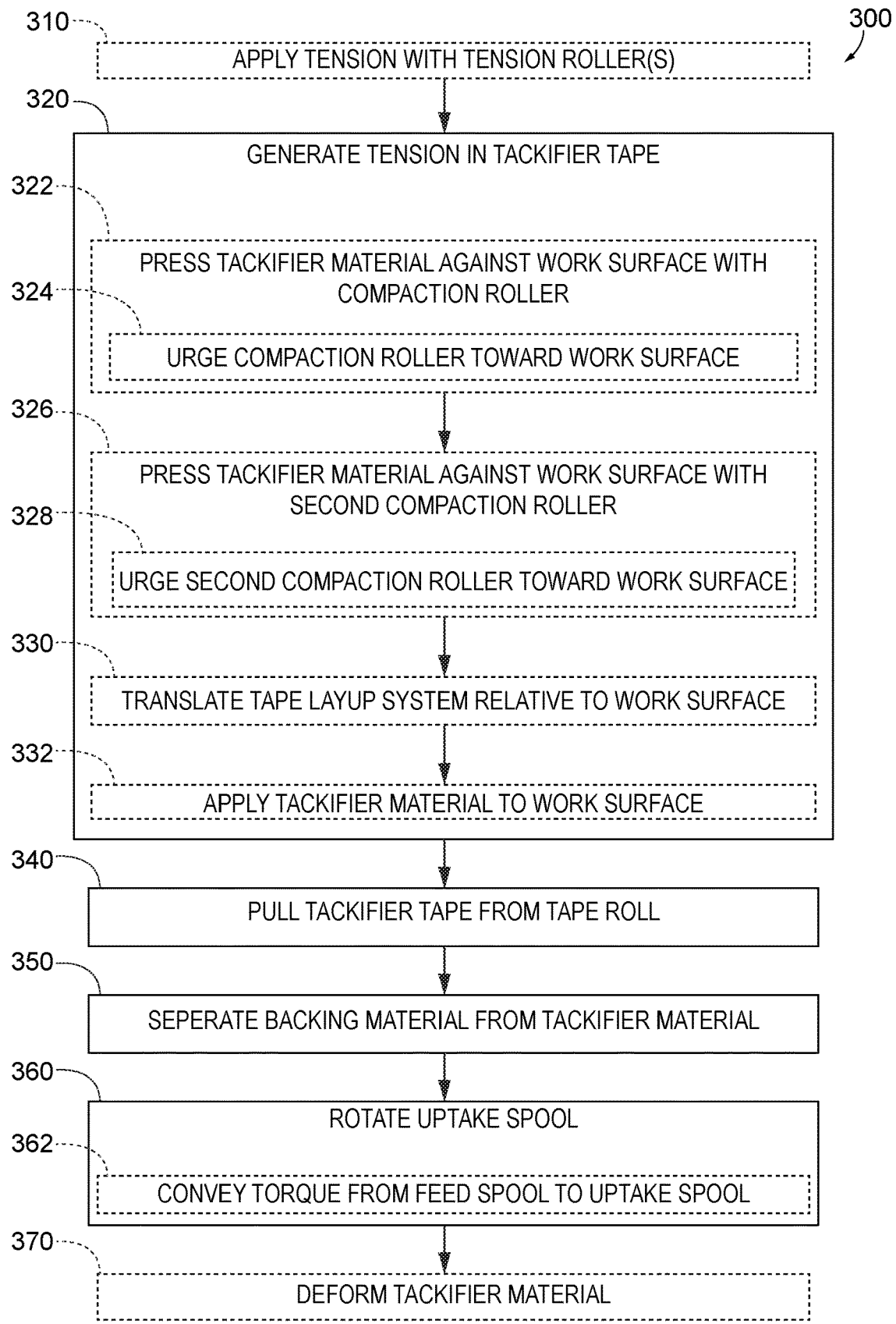
FIG. 6 is a flowchart depicting methods of operating tape layup systems according to the present disclosure.

FIG. 6 is a flowchart depicting methods 300, according to the present disclosure, of operating a tape layup system (such as tape layup system 100). Specifically, methods 300 pertain to methods of operating a tape layup system that includes a tape roll (such as tape roll 210) of a tackifier tape (such as tackifier tape 200) loaded onto a feed spool (such as feed spool 120), such as may be rotatably coupled to a frame (such as frame 110) of the tape layup system. Methods 300 further pertain to examples in which the tackifier tape includes a tackifier material (such as tackifier material 220) and a backing material (such as backing material 230), such as may be affixed to a first tape side (such as first tape side 222) of the tackifier material. Methods 300 further pertain to examples in which the tape layup system includes an uptake spool (such as uptake spool 130), such as may be rotatably coupled to the frame and configured to carry a backing material roll (such as backing material roll 232) of the backing material, and in which the tackifier tape extends between the feed spool and a first compaction roller (such as first compaction roller 162) and between the first compaction roller and the backing material roll.

As shown in FIG. 6, method 300 includes generating tension, at 320, in the tackifier tape between the tape roll and the first compaction roller and, responsive to the tension generated in the tackifier tape by the generating tension at 320, pulling, at 340, the tackifier tape from the tape roll to rotate the feed spool relative to the frame of the tape layup system. In this manner, the pulling the tackifier tape at 340 describes the process of the tackifier tape departing from the tape roll as a result of the generating tension at 320. Method 300 additionally includes separating, at 350, the backing material from the tackifier material and, responsive to the rotation of the feed spool, rotating, at 360, the uptake spool relative to the frame to draw the backing material on to the backing material roll. In this manner, the rotating the uptake spool at 360 may be described as occurring automatically as a result of the pulling the tackifier tape at 340. Hence, method 300 may be described as corresponding to a method of operating a tape layup system such that the pulling the tackifier tape from the tape roll at 340 operates to automatically feed the backing material that was separated from the tackifier material onto the backing material roll.

The generating tension in the tackifier tape at 320 may be performed in any appropriate manner. For example, and as shown in FIG. 6, the generating tension at 320 may include pressing, at 322, the tackifier material against a work surface (such as work surface 10) with the first compaction roller and translating, at 330, the tape layup system relative to the work surface. In this manner, and as shown in FIG. 6, the generating tension at 320 may include applying, at 332, the tackifier material to the work surface as the tape layup system is translated relative to the work surface. The translating at 330 may include moving the tape layup system while the work surface remains substantially stationary, moving the work surface while the tape layup system remains substantially stationary, and/or moving each of the tape layup system and the work surface such that the tape layup system and the work surface move relative to one another. In some examples, the translating the tape layup system relative to the work surface at 330 is performed concurrently with the pressing the tackifier material against the work surface at 322. In this manner, the pressing at 322 may operate to adhere the tackifier material to the work surface, thereby enabling the tackifier tape to be pulled from the tape roll at 340 as the tape layup system is translated relative to the work surface.

The separating the backing material from the tackifier material at 350 may be performed at the compaction roller. For example, the pressing the tackifier against the work surface at 322 may include adhering the tackifier material to the work surface with a greater strength than the backing material is adhered to the tackifier material, and/or the tape layup system may be configured to pull the backing material away from the tackifier material at the compaction roller.

The pressing the tackifier material against the work surface at 322 may be performed in any appropriate manner. For example, and as shown in FIG. 6, the pressing at 322 may include selectively urging, at 324, the first compaction roller toward the work surface with a first roller actuator (such as first roller actuator 164). In some examples, and as further shown in FIG. 6, method 300 additionally may include, at least partially subsequent to the pressing at 322, pressing, at 326, the tackifier material against the work surface with a second compaction roller (such as second compaction roller 166). In such examples, the pressing at 326 may include selectively urging, at 328, the second compaction roller toward the work surface with a second roller actuator (such as second roller actuator 168). The pressing at 326 additionally or alternatively may be performed at least partially concurrent with the pressing at 322. As an example, method 300 may include pressing the tackifier material against the work surface such that a given portion of the tackifier material is pressed against the work surface by the first compaction roller and subsequently is pressed against the work surface by the second compaction roller, while each of the first compaction roller and the second compaction roller operates to concurrently and continuously press respective portions of the tackifier material against the work surface.

The rotating the uptake spool relative to the frame at 360 may be performed in any appropriate manner responsive to the rotation of the feed spool produced by the pulling the tackifier tape at 340. For example, and as shown in FIG. 6, the rotating at 360 may include conveying, at 362, a torque from the feed spool to the uptake spool with a torque transmission system (such as torque transmission system 150). Additionally or alternatively, the rotating at 360 may include rotating the uptake spool about an uptake spool axis (such as uptake spool axis 132) at an uptake spool rotational velocity that is greater than a feed spool rotational velocity at which the feed spool rotates about a feed spool axis (such as feed spool axis 122), at an uptake spool rotational velocity that is less than the feed spool rotational velocity, and/or at an uptake spool rotational velocity that is substantially equal to the feed spool rotational velocity.

With continued reference to FIG. 6, method 300 additionally may include applying, at 310, a tension to the backing material between the tape roll and the compaction roller and/or between the compaction roller and the backing material roll. In such examples, the applying at 310 may include applying a tension with a tackifier tape tensioning assembly (such as tackifier tape tensioning assembly 170) and/or with a backing material tensioning assembly (such as backing material tensioning assembly 180). Additionally or alternatively, the applying at 310 may include applying a tension with one or more tension rollers (such as tension rollers 172) and/or with one or more guide rollers (such as guide rollers 182). The applying the tension at 310 may be performed at least partially prior to the generating tension at 320. For example, the applying at 310 may be understood as describing the operation of the tension rollers to apply a tension (such as a static tension) in the backing material, such as prior to and/or while operating the tape layup system to apply the tackifier material to the work surface.

As further shown in FIG. 6, method 300 further may include, selectively deforming, at 370, the tackifier material with a tape separation tool (such as tape separation tool 190). In such examples, the deforming at 370 may include deforming the tackifier material such that the tackifier material may be severed at the compaction roller. The deforming at 370 may include selectively cutting, scoring, scribing, and/or breaking the tackifier material, such as with a blade (such as blade 192), and may include deforming the tackifier material without damaging the backing material.

Illustrative, non-exclusive examples of inventive subject matter according to the present disclosure are described in the following enumerated paragraphs:

A1. A tape layup system (100) operable to apply a tackifier material (220) to a work surface (10), the tape layup system (100) comprising:

a frame (110);

a feed spool (120) configured to carry a tape roll (210) of a tackifier tape (200) that includes the tackifier material (220) and a backing material (230) affixed to a first tape side (222) of the tackifier material (220), wherein the feed spool (120) is rotatably coupled to the frame (110), and wherein the feed spool (120) is configured to rotate relative to the frame (110) about a feed spool axis (122);

an uptake spool (130) configured to carry a backing material roll (232) of the backing material (230), wherein the uptake spool (130) is rotatably coupled to the frame (110), and wherein the uptake spool (130) is configured to rotate relative to the frame (110) about an uptake spool axis (132);

a torque transmission system (150) configured to convey a torque from the feed spool (120) to the uptake spool (130); and a compaction assembly (160) that includes a compaction roller (162) configured to press the tackifier material (220) onto the work surface (10);

wherein the tape layup system (100) is configured such that, when the compaction roller (162) is translated along the work surface (10), the tape layup system (100) operates to generate a tension in the tackifier tape (200) between the compaction roller (162) and the feed spool (120) to pull the tackifier tape (200) from the tape roll (210) and to rotate the feed spool (120) relative to the frame (110), thereby conveying a torque from the feed spool (120) to the uptake spool (130) via the torque transmission system (150) and rotating the uptake spool (130) relative to the frame (110) to separate the backing material (230) from the tackifier material (220) and to draw the backing material (230) onto the backing material roll (232).

A2. The tape layup system (100) of paragraph A1, wherein the feed spool (120) is operatively coupled to the frame (110) via a feed spool shaft (124) that extends at least partially through the frame (110).

A3. The tape layup system (100) of paragraph A2, wherein the feed spool shaft (124) is configured to rotate relative to the frame (110) about the feed spool axis (122).

A4. The tape layup system (100) of any of paragraphs A1-A3, wherein the uptake spool (130) is operatively coupled to the frame (110) via an uptake spool shaft (134) that extends at least partially through the frame (110).

A5. The tape layup system (100) of paragraph A4, wherein the uptake spool shaft (134) is configured to rotate relative to the frame (110) about the uptake spool axis (132).

A6. The tape layup system (100) of any of paragraphs A1-A5, wherein the compaction assembly (160) further includes a roller actuator (164) configured to selectively urge the compaction roller (162) toward the work surface (10).

A7. The tape layup system (100) of any of paragraphs A1-A6, wherein the compaction roller (162) is a first compaction roller (162), and wherein the compaction assembly (160) further includes a second compaction roller (166) that is operable to engage the tackifier material (220) to further press the tackifier material (220) against the work surface (10).

A8. The tape layup system (100) of paragraph A7, wherein the a/the roller actuator (164) is a first roller actuator (164), and wherein the compaction assembly (160) further includes a second roller actuator (168) configured to selectively urge the second compaction roller (166) toward the work surface (10).

A9. The tape layup system (100) of any of paragraphs A1-A8, wherein, during operative use of the tape layup system (100), the backing material (230) is separated from the tackifier material (220) at the compaction roller (162).

A10. The tape layup system (100) of any of paragraphs A1-A9, wherein the torque transmission system (150) includes a drive means (152) that is operatively coupled to each of the feed spool (120) and the uptake spool (130) to convey the torque from the feed spool (120) to the uptake spool (130).

A11. The tape layup system (100) of paragraph A10, wherein the drive means (152) is operatively coupled to one or both of a/the feed spool shaft (124) and a/the uptake spool shaft (134).

A12. The tape layup system (100) of any of paragraphs A10-A11, wherein the drive means (152) includes one or more of a belt, a chain, and a gear.

A13. The tape layup system (100) of any of paragraphs A1-A12, wherein the torque transmission system (150) is configured to convey the torque from the feed spool (120) to the uptake spool (130) such that pulling the tackifier tape (200) from the tape roll (210) at a feed rate operates to rotate the uptake spool (130) relative to the frame (110) such that the backing material (230) is added to the backing material roll (232) at an uptake rate that is substantially equal to the feed rate.

A14. The tape layup system (100) of paragraph A13, wherein the tape layup system (100) is configured such that the feed rate is equal to the product of a tape roll radius (212) of the tape roll (210), as measured between the feed spool axis (122) and an outer edge of the tape roll (210) in a direction perpendicular to the feed spool axis (122), and a feed spool rotational velocity at which the feed spool (120) rotates about the feed spool axis (122).

A15. The tape layup system (100) of any of paragraphs A13-A14, wherein the tape layup system (100) is configured such that the uptake rate is equal to the product of a backing material roll radius (234) of the backing material roll (232), as measured between the uptake spool axis (132) and an outer edge of the backing material roll (232) in a direction perpendicular to the uptake spool axis (132), and an uptake spool rotational velocity at which the uptake spool (130) rotates about the uptake spool axis (132).

A16. The tape layup system (100) of any of paragraphs A1-A15, wherein the torque transmission system (150) is configured to automatically rotate the uptake spool (130) about the uptake spool axis (132) responsive to the feed spool (120) rotating about the feed spool axis (122).

A17. The tape layup system (100) of any of paragraphs A1-A16, wherein, during operative use of the tape layup system (100), a/the tape roll radius (212) decreases and a/the backing material roll radius (234) increases as the tackifier material (220) is applied to the work surface (10).

A18. The tape layup system (100) of any of paragraphs A1-A17, wherein the torque transmission system (150) includes a tensioner motor (156) configured to rotate the uptake spool (130) about the uptake spool axis (132) to maintain a tension in the backing material (230) between the compaction assembly (160) and the backing material roll (232).

A19. The tape layup system (100) of paragraph A18, wherein the tensioner motor (156) is configured to exert a torque on the uptake spool (130) that is less than a predetermined maximum motor torque.

A20. The tape layup system (100) of any of paragraphs A18-A19, wherein the tensioner motor (156) is configured to exert a torque on the uptake spool (130) such that a/the uptake spool rotational velocity is greater than a/the feed spool rotational velocity.

A21. The tape layup system (100) of any of paragraphs A1-A20, wherein the torque transmission system (150) includes a slip clutch (154) configured to enable the uptake spool (130) to rotate such that the uptake spool (130) rotates about the uptake spool axis (132) at an/the uptake spool rotational velocity that is smaller than a/the feed spool rotational velocity at which the feed spool (120) rotates about the feed spool axis (122) during operative use of the tape layup system (100).

A22. The tape layup system (100) of paragraph A21, when dependent from paragraph A10, wherein the slip clutch (154) is configured to limit the torque that may be transferred from the drive means (152) to the uptake spool (130) to a predetermined maximum slip torque.

A23. The tape layup system (100) of any of paragraphs A1-A22, wherein the torque transmission system (150) includes one or more of a geared transmission system, a variable gear ratio transmission system, a gearbox, an automatic transmission system, a continuously variable transmission system, or a chain-driven transmission system.

A24. The tape layup system (100) of any of paragraphs A1-A23, further comprising a tape separation tool (190) configured to at least partially deform the tackifier material (220) without damaging the backing material (230) at a location between the tape roll (210) and the compaction roller (162) such that the tackifier material (220) may be severed at the compaction roller (162).

A25. The tape layup system (100) of paragraph A24, wherein the tape separation tool (190) is configured to score the tackifier material (220).

A26. The tape layup system (100) of any of paragraphs A24-A25, wherein the tape separation tool (190) is configured to at least partially cut the tackifier material (220).

A27. The tape layup system (100) of any of paragraphs A24-A26, wherein the tape separation tool (190) is configured to at least partially deform the tackifier material (220)

in such a manner that the backing material (230) remains intact between the tape roll (210) and the compaction roller (162).

A28. The tape layup system (100) of any of paragraphs A24-A27, wherein the tape separation tool (190) is configured to at least partially deform the tackifier material (220) without scoring the backing material (230).

A29. The tape layup system (100) of any of paragraphs A24-A28, wherein the tape separation tool (190) is configured to at least partially deform the tackifier material (220) without cutting the backing material (230).

A30. The tape layup system (100) of any of paragraphs A24-A29, wherein the tape separation tool (190) includes a blade (192) that is configured to at least partially deform the tackifier material (220).

A31. The tape layup system (100) of paragraph A30, wherein the tape separation tool (190) includes a blade actuator (194) configured to selectively urge the blade (192) into contact with the tackifier material (220) to at least partially deform the tackifier material (220) at a selected location.

A32. The tape layup system (100) of paragraph A31, wherein the blade actuator (194) is configured to selectively translate the blade (192) toward the tackifier material (220) along a transverse direction (102) that is at least substantially perpendicular to each of a length of the tackifier tape (200) and a width of the tackifier tape (200).

A33. The tape layup system (100) of any of paragraphs A31-A32, wherein the blade actuator (194) is configured to selectively translate the blade (192) across the width of the tackifier material (220).

A34. The tape layup system (100) of paragraph A33, wherein the blade actuator (194) is configured to selectively translate the blade (192) along a lateral direction (104) that is at least substantially parallel to a tape width (204) of the tackifier tape (200) and across a substantial entirety of the tape width (204) of the tackifier tape (200).

A35. The tape layup system (100) of paragraph A34, wherein the blade actuator (194) is configured to selectively translate the blade (192) along the lateral direction (104) across a distance that is larger than the tape width (204).

A36. The tape layup system (100) of any of paragraphs A30-A35, wherein the tape separation tool (190) includes a blade spring (196) that biases the blade (192) toward the tackifier material (220) during operative use of the tape layup system (100).

A37. The tape layup system (100) of paragraph A36, wherein the blade (192) includes a blade tip (193), and wherein the blade spring (196) is configured to bias the blade (192) such that the blade tip (193) extends beyond a proximal surface (206) of the tackifier material (220) that faces the blade (192) by a score depth (191).

A38. The tape layup system (100) of paragraph A37, wherein the tackifier tape (200) has a tape thickness (202), as measured along a direction that is at least substantially parallel to a/the transverse direction (102), and wherein the score depth (191) is one or more of at least 5% of the tape thickness (202), at least 10% of the tape thickness (202), at least 20% of the tape thickness (202), at least 30% of the tape thickness (202), at least 50% of the tape thickness (202), at least 75% of the tape thickness (202), at most 90% of the tape thickness (202), at most 80% of the tape thickness (202), at most 60% of the tape thickness (202), at most 40% of the tape thickness (202), at most 25% of the tape thickness (202), at most 15% of the tape thickness (202), and at most 7% of the tape thickness (202).

A39. The tape layup system (100) of any of paragraphs A37-A38, wherein the score depth (191) is one or more of at least 0.01 millimeter (mm), at least 0.03 mm, at least 0.05 mm, at least 0.1 mm, at least 0.15 mm, at least 0.3 mm, at least 0.5 mm, at most 1 mm, at most 0.7 mm, at most 0.2 mm, at most 0.17 mm, at most 0.12 mm, at most 0.07 mm, and at most 0.02 mm.

A40. The tape layup system (100) of any of paragraphs A1-A39, wherein the uptake spool (130) is a first uptake spool (130); wherein the tape layup system (100) further includes a second uptake spool (140) configured to carry a second backing material roll (242) of a second backing material (240) that is affixed to a second tape side (224) of the tackifier material (220) that is opposite the first tape side (222); wherein the second uptake spool (140) is rotatably coupled to the frame (110); wherein the second uptake spool (140) is configured to rotate relative to the frame (110) about a second uptake spool axis (142); wherein the tape layup system (100) is configured to separate the second backing material (240) from the tackifier material (220) and to draw the second backing material (240) onto the second backing material roll (242); and wherein the torque transmission system (150) is configured such that pulling the tackifier tape (200) from the tape roll (210) operates to automatically rotate the second uptake spool (140) about the second uptake spool axis (142) responsive to the feed spool (120) rotating about the feed spool axis (122) to draw the second backing material (240) onto the second backing material roll (242).

A41. The tape layup system (100) of paragraph A40, wherein the tape layup system (100) is configured to separate the second backing material (240) from the tackifier material (220) at a location between the tape roll (210) and a/the tape separation tool (190).

A42. The tape layup system (100) of any of paragraphs A1-A41, further comprising one or both of:
(i) a tackifier tape tensioning assembly (170) configured to apply a tension to the tackifier tape (200) between the tape roll (210) and the compaction assembly (160); and
(ii) a backing material tensioning assembly (180) configured to apply a tension to the backing material (230) between the compaction assembly (160) and the backing material roll (232).

A43. The tape layup system (100) of paragraph A42, wherein one or both of the tackifier tape tensioning assembly (170) and the backing material tensioning assembly (180) includes one or more of:
(i) one or more tension rollers (172) configured to engage the backing material (230);
(ii) one or more tension roller shafts (174), each tension roller shaft (174) operatively and rotatably coupled to a respective tension roller (172) of the one or more tension rollers (172);
(iii) one or more tension arms (176), each tension arm (176) coupled to a respective tension roller shaft (174) of the one or more tension roller shafts (174) and pivotally coupled to the frame (110); and
(iv) one or more tension springs (178), each tension spring (178) operatively coupled to each of a respective tension arm (176) of the one or more tension arms (176) and the frame (110) to bias the tension roller shaft (174) to urge the tension roller (172) toward the backing material (230).

A44. The tape layup system (100) of paragraph A43, wherein the frame (110) defines one or more slots (112), wherein each tension roller shaft (174) extends through a respective slot (112) of the one or more slots (112).

A45. The tape layup system (100) of any of paragraphs A1-A44, further comprising one or more guide rollers (182)

rotatably coupled to the frame (110) and configured to engage the backing material (230).

A46. The tape layup system (100) of any of paragraphs A1-A45, further comprising an end effector coupling structure (114) configured to operatively engage an end effector of a robot to enable the robot to carry and/or operate the tape layup system (100).

A47. The tape layup system (100) of any of paragraphs A1-A46, further comprising a handle (116) configured to be gripped by a human user to enable the human user to carry and/or operate the tape layup system (100).

B1. A method (300) of operating a tape layup system (100) that includes a tape roll (210) of a tackifier tape (200) loaded onto a feed spool (120), wherein the tackifier tape (200) includes a tackifier material (220) and a backing material (230) affixed to the tackifier material (220), wherein the tape layup system (100) additionally includes an uptake spool (130) configured to carry a backing material roll (232) of the backing material (230), wherein the tackifier tape (200) extends between the feed spool (120) and a first compaction roller (162) of the tape layup system (100), and wherein the backing material (230) extends between the first compaction roller (162) and the backing material roll (232), the method comprising:

generating tension (320) in the tackifier tape (200) between the tape roll (210) and the first compaction roller (162);

responsive to the tension generated in the tackifier tape (200), pulling (340) the tackifier tape (200) from the tape roll (210) to rotate the feed spool (120) relative to a frame (110) of the tape layup system (100);

separating (350) the backing material (230) from the tackifier material (220); and responsive to the rotation of the feed spool (120), rotating (360) the uptake spool (130) relative to the frame (110) to draw the backing material (230) onto the backing material roll (232).

B2. The method (300) of paragraph B1, wherein the generating tension (320) in the tackifier tape (200) includes:

pressing (322) the tackifier material (220) against a work surface (10) with the first compaction roller (162); and translating (330) the tape layup system (100) relative to the work surface (10).

B3. The method (300) of paragraph B2, wherein the generating tension (320) in the tackifier tape (200) further includes applying (332) the tackifier material (220) to the work surface (10) as the tape layup system (100) is translated relative to the work surface (10).

B4. The method (300) of any of paragraphs B2-B3, wherein the translating (330) the tape layup system (100) relative to the work surface (10) is performed concurrently with the pressing (322) the tackifier material (220) against the work surface (10) with the first compaction roller (162).

B5. The method (300) of any of paragraphs B2-B4, wherein the pressing (322) the tackifier material (220) against the work surface (10) with the first compaction roller (162) includes selectively urging (324) the first compaction roller (162) toward the work surface (10) with a first roller actuator (164).

B6. The method (300) of any of paragraphs B2-B5, further comprising, at least partially subsequent to the pressing (322) the tackifier material (220) against the work surface (10) with the first compaction roller (162), pressing (326) the tackifier material (220) against the work surface (10) with a second compaction roller (166).

B7. The method (300) of paragraph B6, wherein the pressing (326) the tackifier material (220) against the work surface (10) with the second compaction roller (166) includes selectively urging (328) the second compaction roller (166) toward the work surface (10) with a second roller actuator (168).

B8. The method (300) of any of paragraphs B1-B7, wherein the separating (350) the backing material (230) from the tackifier material (220) is performed at the first compaction roller (162).

B9. The method (300) of any of paragraphs B1-B8, wherein the rotating (360) the uptake spool (130) relative to the frame (110) includes conveying (362) a torque from the feed spool (120) to the uptake spool (130) with a torque transmission system (150).

B10. The method (300) of any of paragraphs B1-B9, wherein the rotating (360) the uptake spool (130) relative to the frame (110) includes rotating the uptake spool (130) about an uptake spool axis (132) at an uptake spool rotational velocity that is greater than a feed spool rotational velocity at which the feed spool (120) rotates about a feed spool axis (122).

B11. The method (300) of any of paragraphs B1-B10, wherein the rotating (360) the uptake spool (130) relative to the frame (110) includes rotating the uptake spool (130) about an/the uptake spool axis (132) at an/the uptake spool rotational velocity that is less than a/the feed spool rotational velocity at which the feed spool (120) rotates about a/the feed spool axis (132).

B12. The method (300) of any of paragraphs B1-B11, wherein the rotating (360) the uptake spool (130) relative to the frame (110) includes rotating the uptake spool (130) at an/the uptake spool rotational velocity that is at least substantially equal to a/the feed spool rotational velocity of the feed spool (120).

B13. The method (300) of any of paragraphs B1-B12, further comprising: applying (310), with one or more tension rollers (172), a tension to the backing material (230) between the tape roll (210) and the first compaction roller (162) and/or between the first compaction roller (162) and the backing material roll (232).

B14. The method (300) of paragraph B13, wherein the applying (310) the tension with the one or more tension rollers (172) is performed at least partially prior to the generating (320) the tension in the tackifier tape (200).

B15. The method (300) of any of paragraphs B1-B14, further comprising selectively deforming (370) the tackifier material (220) with a tape separation tool (190) such that the tackifier material (220) may be severed at the first compaction roller (162).

B16. The method (300) of paragraph B15, wherein the deforming (370) the tackifier material (220) includes deforming the tackifier material (220) without damaging the backing material (230).

B17. The method (300) of any of paragraphs B1-B16, wherein the tape layup system (100) is the tape layup system (100) of any of paragraphs A1-A47.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. A tape layup system operable to apply a tackifier material to a work surface, the tape layup system comprising:
a frame;

a feed spool configured to carry a tape roll of tackifier tape that includes the tackifier material and a backing material affixed to a first tape side of the tackifier material, wherein the feed spool is rotatably coupled to the frame, and wherein the feed spool is configured to rotate relative to the frame about a feed spool axis;

an uptake spool configured to carry a backing material roll of the backing material, wherein the uptake spool is rotatably coupled to the frame, and wherein the uptake spool is configured to rotate relative to the frame about an uptake spool axis;

a torque transmission system configured to convey a torque from the feed spool to the uptake spool without the use of a motor; and a compaction assembly that includes a compaction roller configured to press the tackifier material onto the work surface;

wherein the tape layup system is configured such that, when the compaction roller is translated along the work surface, the tape layup system operates to generate a tension in the tackifier tape between the compaction roller and the feed spool to pull the tackifier tape from the tape roll and to rotate the feed spool relative to the frame, thereby conveying a torque from the feed spool to the uptake spool via the torque transmission system and rotating the uptake spool relative to the frame to separate the backing material from the tackifier material at the compaction roller and to draw the backing material onto the backing material roll.

2. The tape layup system of claim 1, wherein the torque transmission system is configured to convey the torque from the feed spool to the uptake spool such that pulling the tackifier tape from the tape roll at a feed rate operates to rotate the uptake spool relative to the frame such that the backing material is added to the backing material roll at an uptake rate that is substantially equal to the feed rate.

3. The tape layup system of claim 1, wherein the torque transmission system operates to automatically rotate the uptake spool about the uptake spool axis responsive to the feed spool rotating about the feed spool axis.

4. The tape layup system of claim 1, wherein the torque transmission system includes a tensioner motor configured to rotate the uptake spool about the uptake spool axis to maintain a tension in the backing material between the compaction assembly and the backing material roll, wherein the tensioner motor is configured to exert a torque on the uptake spool that is less than a predetermined maximum motor torque.

5. The tape layup system of claim 1, wherein the torque transmission system includes a slip clutch configured to enable the uptake spool to rotate such that the uptake spool rotates about the uptake spool axis at an uptake spool rotational velocity that is smaller than a feed spool rotational velocity at which the feed spool rotates about the feed spool axis during operative use of the tape layup system.

6. The tape layup system of claim 1, wherein the torque transmission system includes a drive means that is operatively coupled to each of the feed spool and the uptake spool to convey the torque from the feed spool to the uptake spool, wherein the drive means includes one or more of a belt, a chain, and a gear.

7. The tape layup system of claim 1, further comprising a tape separation tool configured to at least partially deform the tackifier material without damaging the backing material at a location between the tape roll and the compaction roller such that the tackifier material may be severed at the compaction roller.

8. The tape layup system of claim 7, wherein the tape separation tool includes a blade that is configured to at least partially deform the tackifier material and a blade actuator configured to selectively urge the blade into contact with the tackifier material to at least partially deform the tackifier material at a selected location.

9. The tape layup system of claim 8, wherein the blade actuator is configured to selectively translate the blade across a width of the tackifier material.

10. The tape layup system of claim 8, wherein the tape separation tool includes a blade spring that biases the blade toward the tackifier material during operative use of the tape layup system.

11. The tape layup system of claim 8, wherein the blade actuator is configured to selectively translate the blade toward the tackifier material along a transverse direction that is at least substantially perpendicular to each of a length of the tackifier tape and a width of the tackifier tape.

12. The tape layup system of claim 8, wherein the blade actuator is configured to selectively translate the blade along a lateral direction that is at least substantially parallel to a tape width of the tackifier tape and across a substantial entirety of the tape width of the tackifier tape.

13. The tape layup system of claim 1, wherein the compaction assembly further includes a roller actuator configured to selectively urge the compaction roller toward the work surface.

14. The tape layup system of claim 1, wherein the compaction roller is a first compaction roller, and wherein the compaction assembly further includes a second compaction roller that is operable to engage the tackifier material to further press the tackifier material against the work surface.

15. The tape layup system of claim 1, wherein the tape layup system lacks a motor for driving rotation of the feed spool.

16. The tape layup system of claim 1, wherein the tape layup system lacks a motor for driving rotation of the uptake spool to draw the backing material onto the backing material roll.

17. A method of operating the tape layup system of claim 1 that includes the tape roll of the tackifier tape loaded onto the feed spool, wherein the tackifier tape extends between the feed spool and the compaction roller of the tape layup system, and wherein the backing material extends between the compaction roller and the backing material roll, the method comprising:

generating tension in the tackifier tape between the tape roll and the compaction roller;

responsive to the tension generated in the tackifier tape, pulling the tackifier tape from the tape roll to rotate the feed spool relative to the frame of the tape layup system;

separating the backing material from the tackifier material; and responsive to the rotation of the feed spool, rotating the uptake spool relative to the frame to draw the backing material onto the backing material roll.

18. The method of claim 17, wherein the rotating the uptake spool relative to the frame includes rotating the uptake spool about the uptake spool axis at an uptake spool rotational velocity that is greater than a feed spool rotational velocity at which the feed spool rotates about the feed spool axis.

19. The method of claim 17, wherein the rotating the uptake spool relative to the frame includes rotating the uptake spool about the uptake spool axis at an uptake spool rotational velocity that is less than a feed spool rotational velocity at which the feed spool rotates about the feed spool axis.

20. The method of claim 17, wherein the separating the backing material and the tackifier material is performed at the compaction roller.

21. The method of claim 17, wherein the generating tension in the tackifier tape includes:
pressing the tackifier material against the work surface with the compaction roller; and
translating the tape layup system relative to the work surface.

22. The method of claim 21, wherein the generating tension in the tackifier tape further includes applying the tackifier material to the work surface as the tape layup system is translated relative to the work surface.

23. The method of claim 21, wherein the pressing the tackifier material against the work surface with the compaction roller includes selectively urging the compaction roller toward the work surface with a roller actuator.

24. The method of claim 21, wherein the compaction roller is a first compaction roller, wherein the pressing the tackifier material against the work surface with the compaction roller includes pressing the tackifier material against the work surface with the first compaction roller, and wherein the method further comprises, at least partially subsequent to the pressing the tackifier material against the work surface with the first compaction roller, pressing the tackifier material against the work surface with a second compaction roller, wherein the pressing the tackifier material against the work surface with the second compaction roller includes selectively urging the second compaction roller toward the work surface with a second roller actuator.

25. The method of claim 21, further comprising selectively deforming, with a tape separation tool, the tackifier material such that the tackifier material may be severed at the compaction roller.

* * * * *